United States Patent

[11] 3,586,391

| [72] | Inventors | George K. Farmery;<br>Neville Turner, both of Lincoln, England |
|------|-----------|----------------------------------------------------------------|
| [21] | Appl. No. | 816,993                                                        |
| [22] | Filed     | Apr. 17, 1969                                                  |
| [45] | Patented  | June 22, 1971                                                  |
| [73] | Assignee  | Clayton Dewandre Company Limited<br>Lincoln, England           |
| [32] | Priority  | Apr. 22, 1968                                                  |
| [33] |           | Great Britain                                                  |
| [31] |           | 18911/68                                                       |

[54] FLUID PRESSURE OPERATED BRAKING SYSTEMS
2 Claims, 5 Drawing Figs.

[52] U.S. Cl. .................................................. 303/54,
303/89
[51] Int. Cl. .................................................. B60t 15/00
[50] Field of Search ........................................ 303/52, 54,
9, 13, 28—30, 7, 89

[56] References Cited
UNITED STATES PATENTS

| 3,107,126 | 10/1963 | Valentine | 303/9 |
| 3,228,730 | 1/1966 | Schubert | 303/13 |
| 3,241,888 | 3/1966 | Ternent | 303/9 |
| 3,285,672 | 11/1966 | Avrea | 303/9 |

*Primary Examiner*—Milton Buchler
*Assistant Examiner*—John J. McLaughlin
*Attorney*—Norris & Bateman

ABSTRACT: In a compressed air operated braking system in which the brake motors are fitted with lock actuators and in which the compressor incorporates unloader means actuated by a governor valve responsive to reservoir pressure, movement of a control member to render the lock actuators inoperative also effects delivery of compressed air to the governor valve to augment the spring loading thereof and so temporarily establish a higher pressure in the system for releasing the lock actuators.

3,586,391

INVENTORS
GEORGE KENNETH FARMERY &
NEVILLE TURNER

BY NORRIS & BATEMAN
ATTORNEY

FLUID PRESSURE OPERATED BRAKING SYSTEMS

This invention relates to fluid pressure operated braking systems for motor vehicles and particularly to compressed air operated systems of the kind in which some or all of the brake actuators are also used for parking purposes by providing in association with said actuators roller and wedge or similar mechanically operated locking devices, commonly called lock actuators, which coact with the output rods of the brake actuators to lock them in their operative position, the lock actuators being held in an inoperative position during normal running conditions by the application of reservoir pressure to a pressure ring or equivalent member preventing the wedging action of the rollers upon the brake actuator rods.

When parking with a system of this kind the brake actuators are first pressurized to apply the brakes, the lock actuators are then exhausted to cause engagement of the mechanical locking means and the brake actuators are then exhausted leaving the brakes held on solely by the mechanical lock. However, when it is desired to release the brakes it is often found that due to cooling of the brake drums the mechanical locking means have jammed on so tightly that the available reservoir pressure is insufficient to effect the initial forward movement of the brake rod necessary to release the mechanical lock, and it is the object of the present invention to provide a simple but effective means for momentarily obtaining a higher pressure than is normally available for lock actuator release.

According to the invention in a brake system of the kind mentioned and in which normal operating reservoir pressure is determined by compressor unloader means controlled by a governor valve responsive to the reservoir pressure, movement of a control member to release the lock actuators also causes a compressed air supply to be connected to the governor valve in a manner to augment the spring loading thereof and so cause the compressor to deliver and build up a higher pressure in the reservoir.

A preferred embodiment of the invention will now be described with reference to the accompanying drawings wherein.

Figure 1:
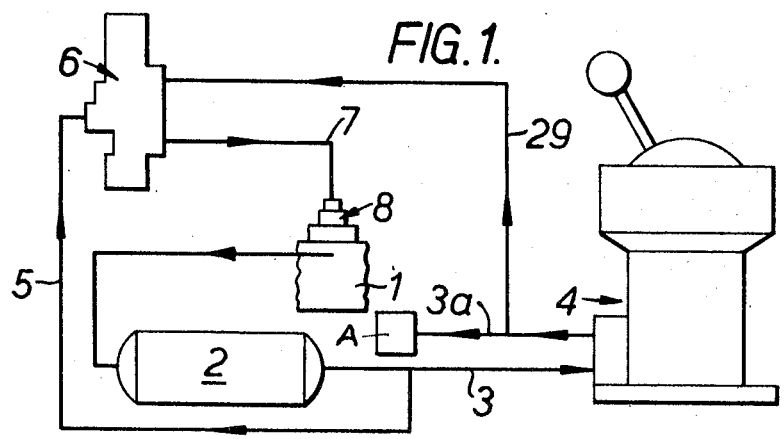
FIG. 1 is a diagrammatic view of the control section of the braking system.
Figure 4:
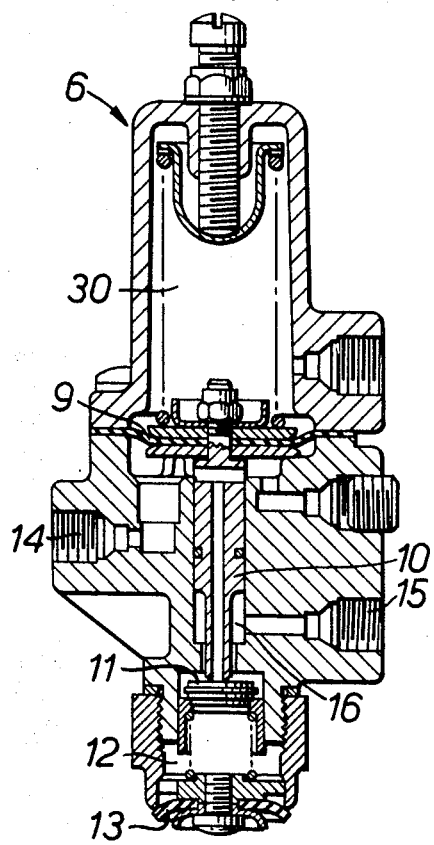
FIGS. 4 and 5 are sectional views of the governor valve and unloader respectively.
Figure 5:
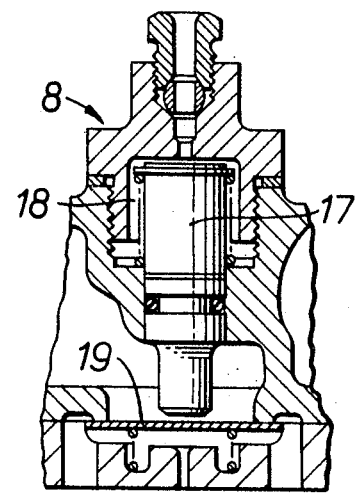

Referring first to FIG. 1, the system comprises a compressor 1 feeding a reservoir 2 from which a supply conduit 3, 3a leads by way of hand-operated valve unit 4 to multidiaphragm brake actuators indicated at A. These actuators may for example be of the double diaphragm type employing wedge lock actuators as disclosed in U.S. Pat. No. 3,453,030 issued July 1, 1969. The outlet side of the reservoir is also connected by conduit 5 to a spring-loaded diaphragm type governor valve 6 controlling the feed of compressed air through conduit 7 to an unloader valve 8 in the head of the compressor. The governor valve is of known construction and as shown in FIG. 4 comprises a spring-loaded diaphragm 9 carrying a tubular valve plunger 10 the lower end of which cooperates with a spring-loaded disc valve 11 located in a chamber 12 permanently connected to atmosphere past a check valve 13. Reservoir pressure is introduced by way of port 14 to the underside of the diaphragm whilst a further port 15 communicates with an annular chamber 16 surrounding a reduced section of the valve plunger 10. The unloader valve 8 is likewise of known construction and includes a spring-loaded plunger 17 displaceable in a chamber 18 to which air is admitted under control of the governor valve, the lower end of the plunger coacting with a spring-loaded plate valve 19 to move it off its seating and connect the compressor cylinder to atmosphere. Thus, it will be understood that when the compressor is operating and reservoir pressure reaches a predetermined value, the pressure acting on the underside of the diaphragm 9 overcomes the force of the loading spring, so lifting the diaphragm and the valve plunger 10. The disc valve 11 then seats on the housing and closes off the exhaust connection and, as the lower end of the valve plunger leaves the disc valve, port 14 is connected to port 15 by way of the bore of the valve plunger and annular chamber 16. In this manner, compressed air is fed to the unloader valve, depressing the plunger 17 and so opening plate valve 19 whereby further buildup of pressure in the reservoir is arrested.

Figure 3:
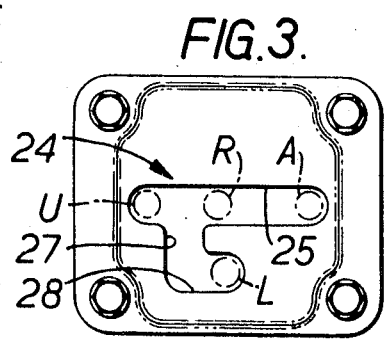
FIG. 3 is a plan view of FIG. 2 to a reduced scale and with the hand lever omitted for clarity.
Figure 2:
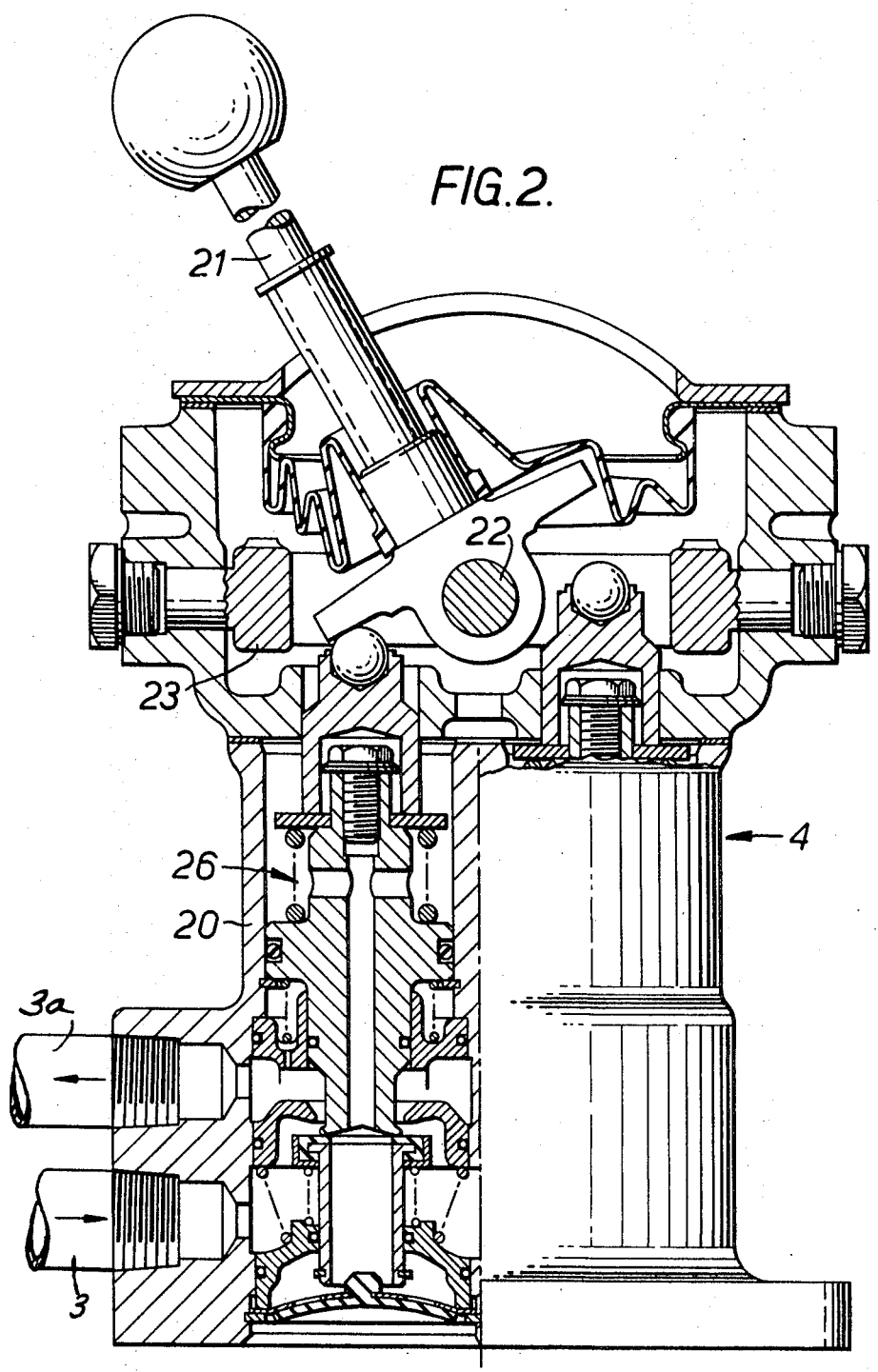
FIG. 2 is a part sectional side view of the control valve.

The valve unit 4, the construction of which forms no part of the present invention, consists basically of an assembly of vertically disposed valve devices contained within a common housing 20 and operable selectively by a hand lever 21 projecting from the upper end of the housing. The hand lever is pivotally mounted on a cross shaft 22, see FIG. 2, which is supported in a yoke 23 pivoted in the housing on an axis at right angles to the axis of shaft 22 whereby the hand lever is movable in two directions perpendicular to each other. The hand lever extends through a gate 24 in the housing cover, see FIG. 3, and its movements perform the following operations. In the "brakes off" or "release" position, the hand lever is located at the midpoint R of the longer gate slot 25 and movement of the lever to the point A at one end of the slot will actuate a reactive valve device (not Shown) to connect an auxiliary air line to the auxiliary diaphragms in the brake actuators. Movement of the hand lever to the other end U of the gate slot 25, referred to as the "unlock" position, will actuate the reactive valve device indicated generally at 26 in FIG. 2 to admit air to so-called parking diaphragms of the brake actuators, which may be the diaphragms fed by the auxiliary line or additional diaphragms. The gate 24 also includes a transverse slot 27 leading into a short slot 28 parallel to slot 25 and terminating at a "lock park" position indicated at L. Thus to set the brakes for parking, the hand lever 21 is first moved to the left (FIG. 3) so admitting air to the brake actuators, it is then moved through slot 27, during which movement it actuates an "on-off" type valve (not shown) to exhaust the air from the lock actuators so permitting these devices to become operative, and the hand lever is finally moved to the "park lock" position L to exhaust air from the brake actuators. The movement of lever 21 through transverse slot 27 is preferably damped to ensure pressure buildup in the brake actuators before the lock actuators become operative and the brake actuators are exhausted. This damping of the hand lever movement is disclosed in the copending application of D. H. Ballard et al., Ser. No. 816,958 filed Apr. 17, 1969.

When releasing the brakes after parking, the hand lever is moved through the gate to the unlock position U but, as previously explained, the full reservoir pressure thus applied is sometimes insufficient to release the brakes, particularly when parking with hot brake drums with their subsequent contraction upon cooling, and to overcome this defect the conduit 3a leading from valve unit 4 to the auxiliary or parking diaphragms of the brake actuators is provided with a branch line 29 leading to the chamber 30 above the diaphragm in the governor valve. Thus, reservoir pressure augments the spring loading on the diaphragm whereby the compressor is caused to generate a higher pressure in the system before the unloader becomes operative, this increased pressure providing the necessary displacement of the brake actuator diaphragms to effect release of the lock actuators. When the hand lever is returned to the "release" position reservoir pressure to the governor valve is cut off and normal governor control is resumed.

We claim:

1. A vehicle braking system comprising an air compressor, a reservoir having an inlet connected to said compressor, a control valve unit having an inlet connected to said reservoir and an outlet connected to deliver operating fluid pressure to a brake actuator control in said system, a spring-loaded governor valve having an inlet connected to the outlet of said reservoir, an unloader valve for said compressor connected to the outlet of said governor valve, said governor valve being responsive to reservoir pressure to actuate said unloader valve to limit pressure buildup in said reservoir, and means connecting the outlet of said control valve unit to said governor valve to augment the spring loading of said governor valve when said control valve unit is actuated to operate said brake actuator control whereby said compressor is caused to temporarily deliver and build up a higher pressure in said reservoir.

2. The vehicle braking system defined in claim 1 wherein said governor valve comprises a diaphragm exposed on one side to reservoir pressure and spring loaded on the other side, and the outlet of said control valve unit comprising conduit means having one branch extending to said brake actuator control and another branch extending to said other side of said diaphragm.